United States Patent [19]

Dickson

[11] Patent Number: 5,655,834
[45] Date of Patent: Aug. 12, 1997

[54] BLENDER APPLIANCE WITH BEVELED BLADE PORTIONS

[75] Inventor: Thomas D. Dickson, Highland, Utah

[73] Assignee: K-Tec, Inc., Linden, Utah

[21] Appl. No.: 646,987

[22] Filed: May 8, 1996

Related U.S. Application Data

[60] Continuation of Ser. No. 371,092, Jan. 10, 1995, abandoned, which is a division of Ser. No. 938,012, Aug. 27, 1982, Pat. No. 5,380,086.

[51] Int. Cl.⁶ .................................................. A47J 43/07
[52] U.S. Cl. ..................... 366/205; 366/314; 241/282.1; 241/292.1
[58] Field of Search ............................... 366/130, 197, 366/205, 314, 342, 343; 241/37.5, 74, 92, 199.12, 282.1, 282.2, 292.1; 99/348

[56] References Cited

U.S. PATENT DOCUMENTS

| | | | |
|---|---|---|---|
| 1,536,203 | 5/1925 | Frydenlund | 366/314 |
| 2,109,501 | 3/1938 | Osius | 241/282.2 |
| 2,223,018 | 11/1940 | Christensen | 266/314 |
| 2,585,255 | 2/1952 | Kochner et al. | 366/205 X |
| 2,685,435 | 7/1954 | Moore | 366/205 X |
| 2,702,571 | 2/1955 | Murray | 241/282.1 X |
| 2,740,029 | 3/1956 | Kueser et al. | 366/205 X |
| 2,750,162 | 6/1956 | Korcher | 366/205 |
| 2,758,623 | 8/1956 | Malz et al. | 366/205 X |
| 2,794,627 | 6/1957 | Rodwick | 366/205 X |
| 2,886,254 | 5/1959 | Rohlinger et al. | 241/74 |
| 2,897,862 | 8/1959 | Malz et al. | 366/205 X |
| 3,036,614 | 5/1962 | Knapp | 366/314 X |
| 3,175,594 | 3/1965 | Jepson et al. | 366/205 X |
| 3,240,246 | 3/1966 | Dewenter | 366/205 X |
| 3,368,800 | 2/1968 | Barnard, Jr. | 241/282.2 |
| 3,596,692 | 8/1971 | Swanke | 366/205 X |
| 3,603,364 | 9/1971 | Samuelian et al. | 366/205 X |
| 3,738,583 | 6/1973 | Berland et al. | 241/46.17 |
| 4,577,975 | 3/1986 | McCrory et al. | 366/205 X |

FOREIGN PATENT DOCUMENTS

| | | | |
|---|---|---|---|
| 515424 | 8/1954 | Belgium | 241/199.12 |
| 4-73021 | 3/1992 | Japan | 241/98 |
| 244813 | 5/1947 | Switzerland | 366/205 |
| 1524925 | 11/1989 | U.S.S.R. | 241/74 |

*Primary Examiner*—Charles E. Cooley
*Attorney, Agent, or Firm*—Mallinckrodt & Mallinckrodt

[57] ABSTRACT

A blender appliance for blending food includes a base with a motor therein. A blender receptacle is removably mounted on the base so that the motor will rotate a blade mounted in the receptacle. The blade is mounted midway along its length for rotation about on axis of rotation. The blade includes blade end tips extending upwardly parallel with the axis of rotation or alternative substantially perpendicularly to the blade adjacent its ends. The blade tips are beveled outwardly and rearwardly from their leading edges and the blade is also beveled downwardly and rearwardly from its leading edges.

17 Claims, 7 Drawing Sheets

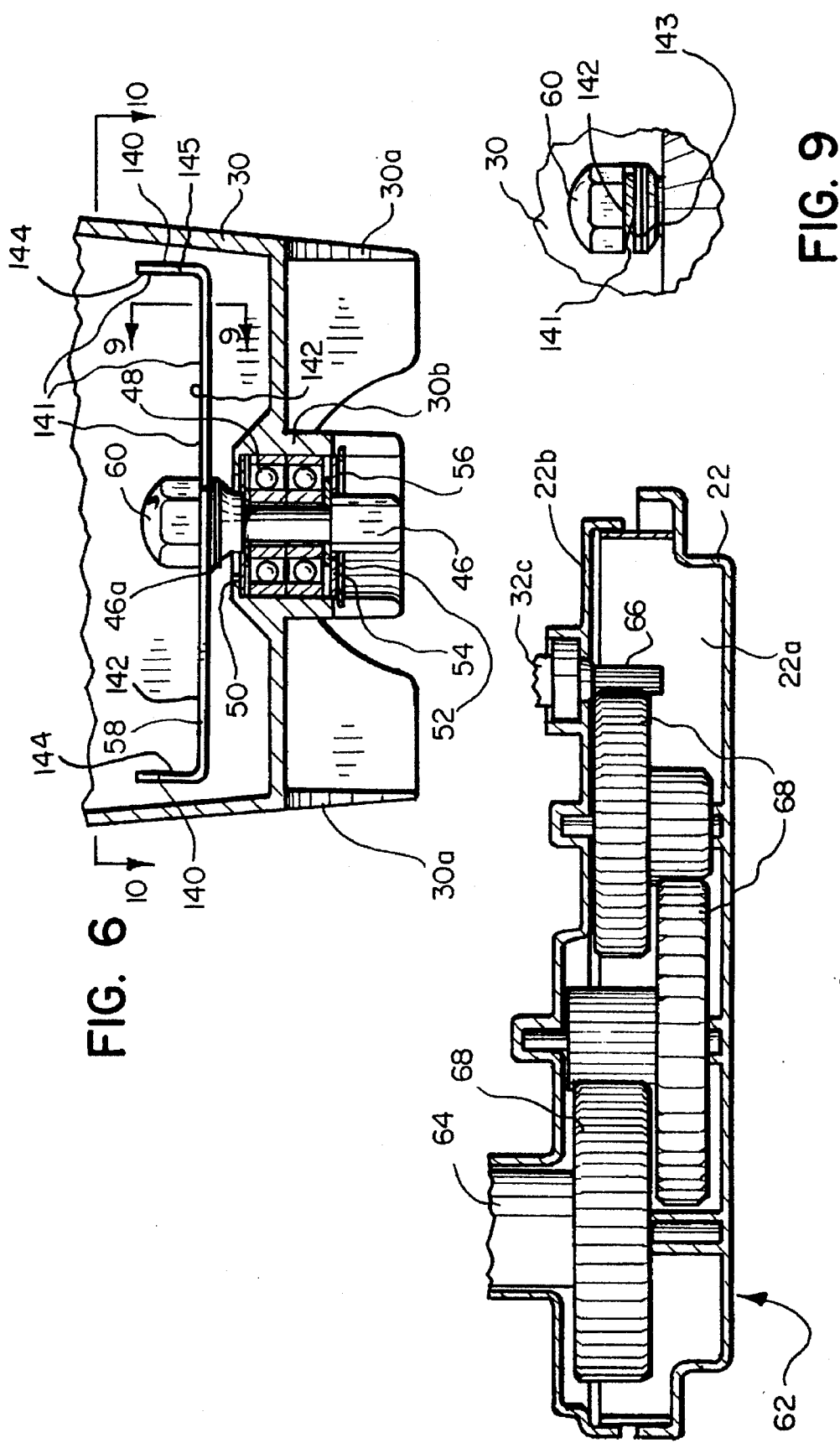

BLENDER APPLIANCE WITH BEVELED BLADE PORTIONS

This application is a continuation of application Ser. No. 08/371,092, filed Jan. 10, 1995, now abandoned which was a division of application Ser. No. 07/938,012, filed Aug. 27, 1992 now U.S. Pat. No. 5,380,086.

BACKGROUND OF THE INVENTION

1. Field

The present invention relates generally to food mixing appliances for domestic use and more specifically to multi-purpose electric food mixers specially adapted to mix and knead bread dough in combination with a blender device that utilizes one power source to drive both blender and mixer.

2. State of the Art

In multipurpose kitchen appliances of the type with which the invention is concerned there is typically provided an electric motor secured to a base with a cover attached to the base. The lower end of the output armature shaft of the motor is typically operably attached via a gearbox or pulley to a drive shaft extending through a bottom wall of the mixing receptacle. The upper portion of the drive shaft has a mixing utensil, such as a beater or dough hook, connected to it for mixing a food stuff. The upper end of the output armature shaft of the electric motor is operably attached directly to an impeller means whose impeller shaft extends through the bottom wall of a blender receptacle.

A problem with such prior art devices has been that the cover is not adequately secured to the motor housing so that there is movement of the motor relative to the cover. In the past this problem has been overcome by placing a flexible diaphragm between the base cover and the drive element of the motor which will allow movement of the motor with respect to the cover. This arrangement is undesirable because protection of the motor from spilled liquids depends on the integrity of the diaphragm.

Some of such prior art mixing appliances have been specially adapted to knead dough. A common objective of such dough kneading equipment is to provide desirable dough developing action which develops a network of gluten strands critical to the rising process. The procedure for making dough can be divided into stages. The first stage is to bring about absorption of the liquid ingredients in the dry ingredients, the so-called "pick-up" stage. Next, there is the "clean-up" stage, where materials start to agglomerate. Then, there is the "development" stage, where the gluten in the wheat flour develops and forms a gel as a whole. During development, the gluten in the dough mixture develops a desired cell wall strength to prevent escape of the gas that is trapped in the dough. Such gas retention is required in order to get the desired lightness of the resulting product. While kneading, it is desired to create a pulling action of these gluten strands instead of cutting through such strands. Over-kneading results in a "let-down" stage in which the gluten network breaks down resulting in an undesirably heavy baked end-product.

Hayashi, in U.S. Pat. No. 4,747,690 issued May 31, 1988 and U.S. Pat. No. 4,790,665 issued Dec. 13, 1988, discloses a strain gauge for detecting the progress of kneading in a commercial setting. In addition to measuring strain, temperature and pH of the dough are monitored. The measured strain values along with other measured values are transmitted to a computer control device which compares them to a set of control values. When the measured strain values are within the range of control values at each predetermined measuring point the computer allows kneading to continue. If the measured values deviate from the range of control values, the computer transmits a signal to stop the drive device or calculates a relevant time for subsequent kneading. When the kneading proceeds to a predetermined point in the "development" stage as indicated by the preset control values, the computer transmits a signal to stop the drive device.

The problem with this Hayashi system is that it requires development of sets of control values for comparison to the values measured by the probes and sensors. These control values apply to certain types of dough in set amounts. Thus, the equipment is not usable with automatic control over a wide variety of doughs or with variable amounts of dough used in the equipment.

A further problem with domestic dough kneading equipment has been that the entire capacity of the mixing receptacle has not been fully utilizable. Some of the dough hooks employed tend to move the dough upward out of the receptacle and, thus, unnecessarily limit the amount of dough that can be processed in the receptacle. Also, lids that have been provided in the past further limit the capacity of the receptacle.

Another problem with both commercial and domestic devices of the prior art has been action between the dough hooks and the stators. It has been usual to supply a pair of oppositely disposed dough hooks and a pair of corresponding oppositely disposed stators. Since both the stators and the dough hooks are oppositely disposed, the dough balls on the stators are forced through the dough hooks at the same time, thereby producing a doubled amount of drag on the motor.

SUMMARY OF THE INVENTION

In the making of the present invention it was an object to provide an apparatus for kneading bread dough that will automatically shut off when the gluten in the dough is fully developed. Further objects were to provide a combination mixing and blending apparatus wherein the cover is securely attached to the motor support; to maximize the effective volume of the mixing receptacle; and to provide a dough hook/stator arrangement that produces less drag on the motor.

Briefly described, the invention is directed to a combination domestic mixing and blending appliance having a base and removable mixing and blending receptacles supported on and driven from an electric motor in the base at multiple selected speeds. The invention improves this known combination by providing a mechanism for sensing the development of bread dough in the mixing receptacle during kneading of the dough and automatically shutting off the motor once full development of the dough is accomplished. It has been found that during the "development" stage of the dough, the dough gets stickier and stickier, i.e. it gets more viscous and difficult to knead. As it passes from the "development" stage to the "let-down" stage, the dough gets more viscous and easier to knead. It has been found that generally, the ideal point in bread making to stop kneading is as the dough reaches the end of the "development" stage. This results in moist, good textured, light bread. Thus, the invention provides means for sensing when the dough being kneaded reaches the end of its "development" stage. This done by sensing the point when it becomes easier to knead, indicating the end of the "development" stage and the start of the "let-down" stage.

In its preferred form, the motor drives a fan having multiple, evenly spaced blades thereon. A sensing element is disposed adjacent to the fan. As each blade of the fan passes the sensing element an output signal is generated and fed to a computer circuit which adjusts the power supply to the motor in order to maintain a constant speed. The computer keeps track of the amount of power required. As the dough goes through the "pick-up", "clean-up", and "development" stages, power requirements increase. Just as the dough enters the "let-down" phase its resistance decreases and the power requirement decreases. Decrease in power is sensed and the computer stops the motor. Thus, the dough is properly kneaded and is prevented from getting over-kneaded.

In another aspect of this invention a uni-body motor housing and cover is provided. The motor housing is secured to the base and is equipped with multiple post members which interengage with corresponding multiple-post-receiving members molded in the cover. This arrangement allows for accurate alignment between the blender receptacle secured to the cover and the motor.

In yet another aspect of this invention, maximum capacity of the mixing receptacle is obtained by providing a lid which provides additional depth for such receptacle. The lid has an off-centered feed chute for addition of ingredients once the lid has been positioned on the receptacle. Additionally, the capacity of the mixing receptacle for kneading dough is further maximized by providing dough hooks which are angled in such manner as to pull the dough in a downward action into the bowl as the hooks are rotated past a stator. The downward pulling action of the dough hooks reduces the pressure on the lid and provides better mixing of the dough.

In still another aspect of this invention, a novel dough hook/stator arrangement is provided. Instead of providing a pair of oppositely disposed dough hooks and corresponding pair of oppositely disposed stators, as is usual, preferably a single stator is provided and a pair of dough hooks which produces only about half the drag on the motor as do the conventional arrangement. In other words, an even number of dough hooks and an odd number of stators provides an arrangement that produces less drag on the motor. Alternatively, an odd number of dough hooks and an even number of stators could be provided to achieve essentially the same result.

THE DRAWINGS

The best mode presently contemplated for carrying out the invention is illustrated in the accompanying drawings, in which:

FIG. 1 is a perspective view of a combination mixer and blender according to the invention;

FIG. 2, a view in front elevation showing the device of FIG. 1 minus the mixing and blending receptacles and with the cover lifted off the base;

FIG. 3, a top plan view of the base section taken along the line 3—3 of. FIG. 2;

FIG. 4, a fragmentary vertical section taken along the line 4—4 of FIG. 2 and drawn to a larger scale;

FIG. 5, a fragmentary vertical section of the gearbox taken along the line 5—5 of FIG. 3;

FIG. 6, a fragmentary vertical section taken along the line 6—6 of FIG. 1 and drawn to a larger scale, showing only the lower part of the blending receptacle;

FIG. 7, a top plan view of the mixing receptacle per se, the lid having been removed taken along the line 7—7 of FIG.

FIG. 8, a vertical section taken along the line 8—8 of FIG. 7;

FIG. 9, a fragmentary vertical section taken on the line 9—9 of FIG. 6;

FIG. 10, a longitudinal section taken on the line 10—10 of FIG. 6;

FIG. 11, a block diagram of control circuitry of the invention; and

FIG. 12, a circuit diagram of the circuitry of FIG. 11.

DETAILED DESCRIPTION OF THE ILLUSTRATED EMBODIMENT

Figure 1:
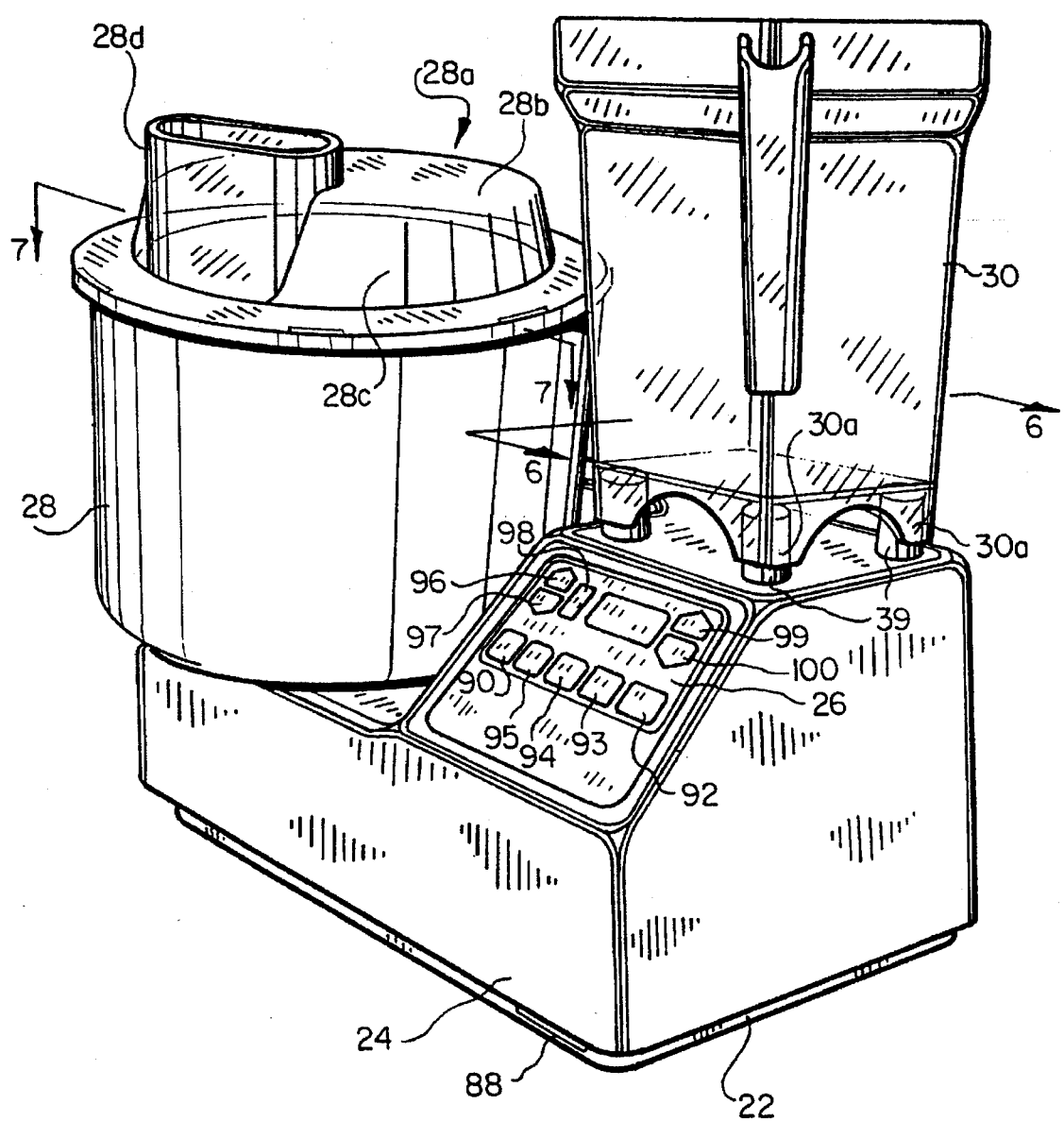

Referring to FIG. 1 of the drawings, there is shown a combination mixing-blending domestic kitchen appliance. The appliance includes a base 22 and a cover 24 which includes control panel 26. The cover 24 supports a mixing receptacle 28 having lid 28a and blender receptacle 30. Lid 28a has a substantially circular, broad, back wall 28b and a relatively narrow, rounded, side wall 28c defining a corresponding broad opening into the lid compartment opposite the back wall. The lid has a feed chute 28d penetrating the back wall and disposed off-center thereof.

Figure 2:
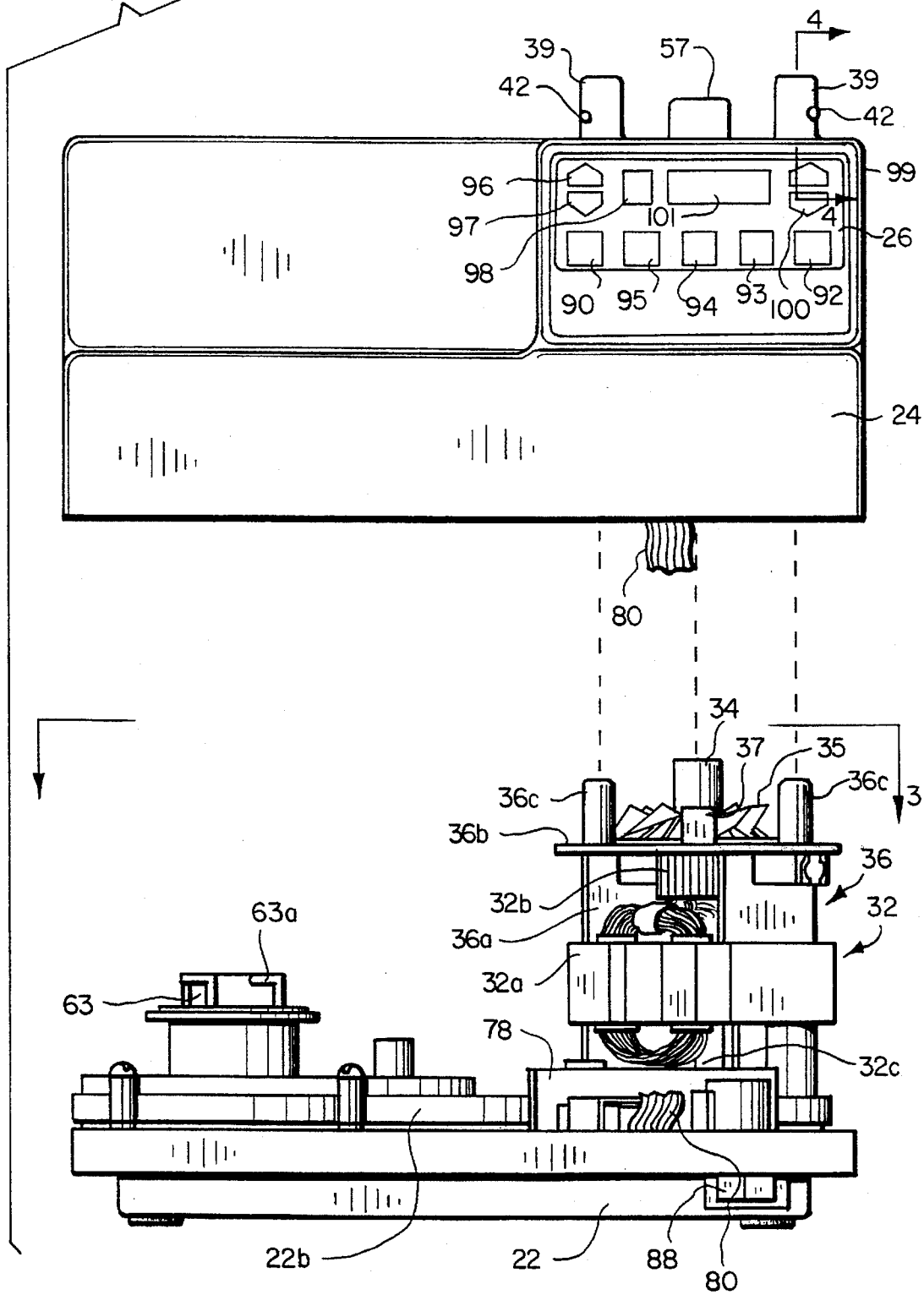

In FIG. 2, cover 24 is shown removed from base 22. On the base, there is mounted an electric motor 32, which includes a field 32a, an armature 32b, and an output armature shaft 32c. The motor is preferably about 1.8 peak horsepower, 1400 Watts, and capable of attaining 28,000 rpm. On the upper end of the armature shaft, there is an upper output drive coupling 34 which retains a fan 35, FIGS. 2 and 3. Motor housing 36 surrounds the upper portion of motor 32 and includes wall member 36a and upper platform member 36b. Disposed on upper platform member 36b adjacent to fan 35 is sensing element 37. Molded as part of upper platform member 36b are multiple post members 36c which interengage with corresponding post-receiving members 38, FIG. 4, that are molded into the cover. This provides accurate positioning between the base 22 and cover 24 and maintains them rigidly in correct relative position.

Figure 4:
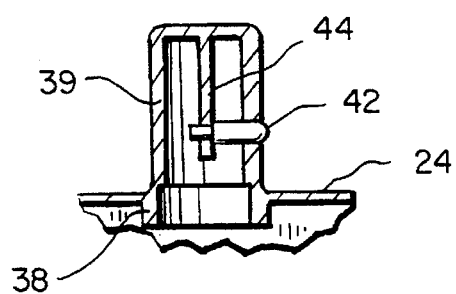
Figure 7:
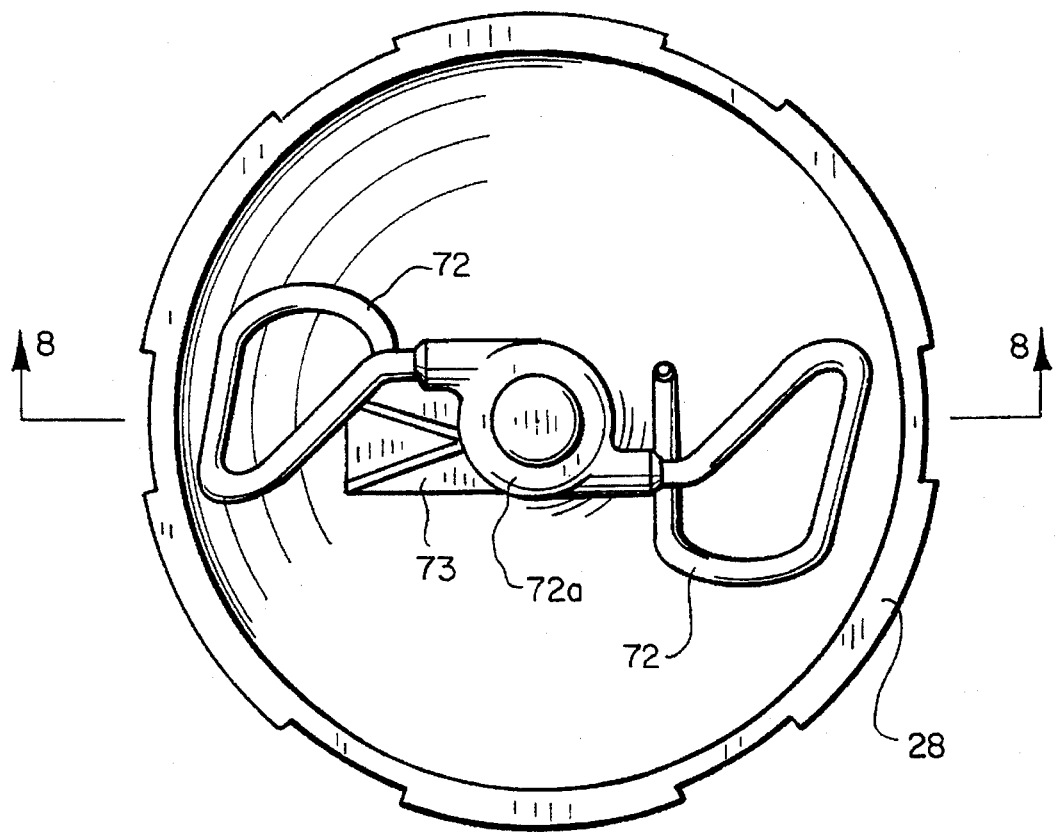

Extending vertically from the cover and from the post-receiving members 38 are preferably four secondary posts 39, FIGS. 1, 2, and 4, which engage four feet 30a, respectively, on blending receptacle 30. Each secondary post has a securement pin 42, FIGS. 2 and 4, having one end extending through a resilient tab 44, FIG. 4, inside the secondary post and the other end extending through the secondary post to releasably interengage with a notch (not shown) in the foot 30a of the blending receptacle 30 when in blending position on cover 24. The bottom wall of the blending receptacle is penetrated by an impeller shaft 46 as shown in FIG. 6. Within an impeller shaft housing 30b, there is a double ball bearing assembly 48 surrounding impeller shaft 46. An upper seal 50 is disposed between the upper ball bearing and the blending receptacle. A lower seal 52 and washer 54 is retained in place by a snap ring 56. The upper portion of impeller shaft 46 has a flange 46a and is threaded to receive impeller blade means 58 and nut 60. A flange 57, FIG. 2, extends from cover 24 surrounding drive coupling 34 and is received between the impeller shaft 46 and the lower portion of impeller shaft housing 30b.

Figure 3:
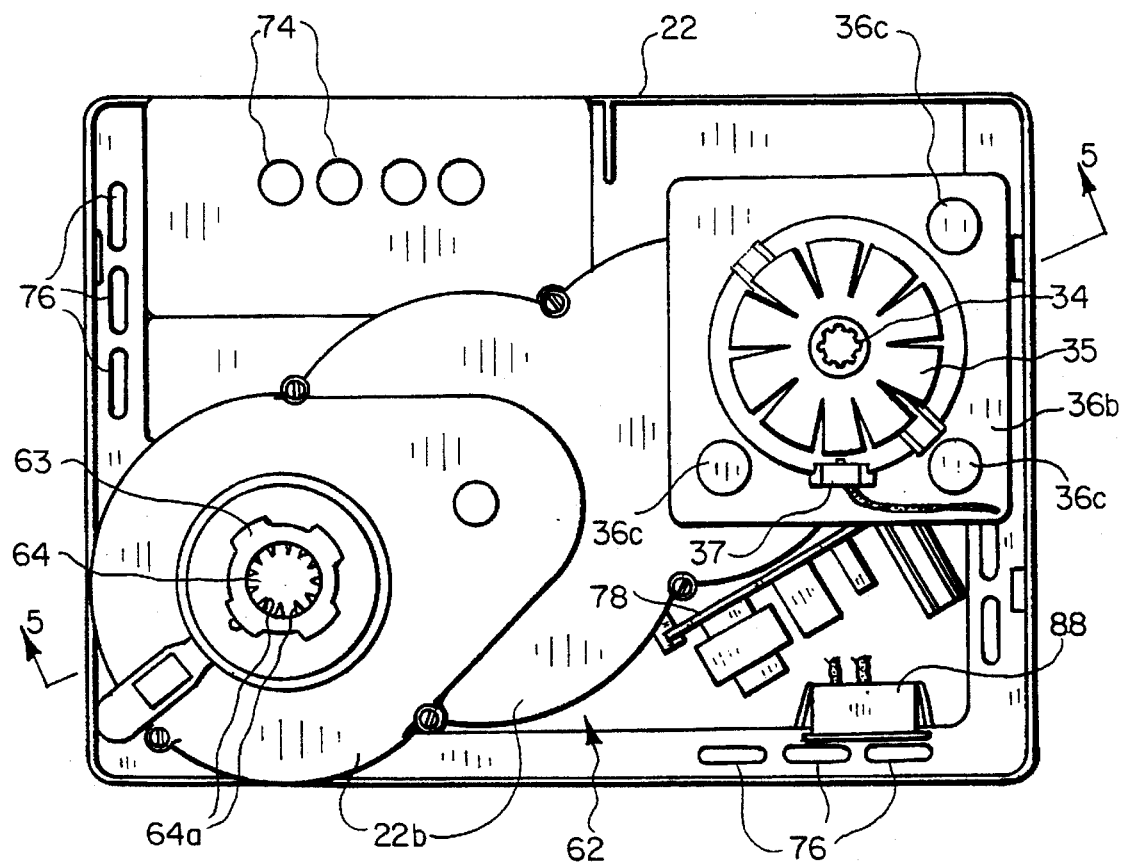
Figure 8:
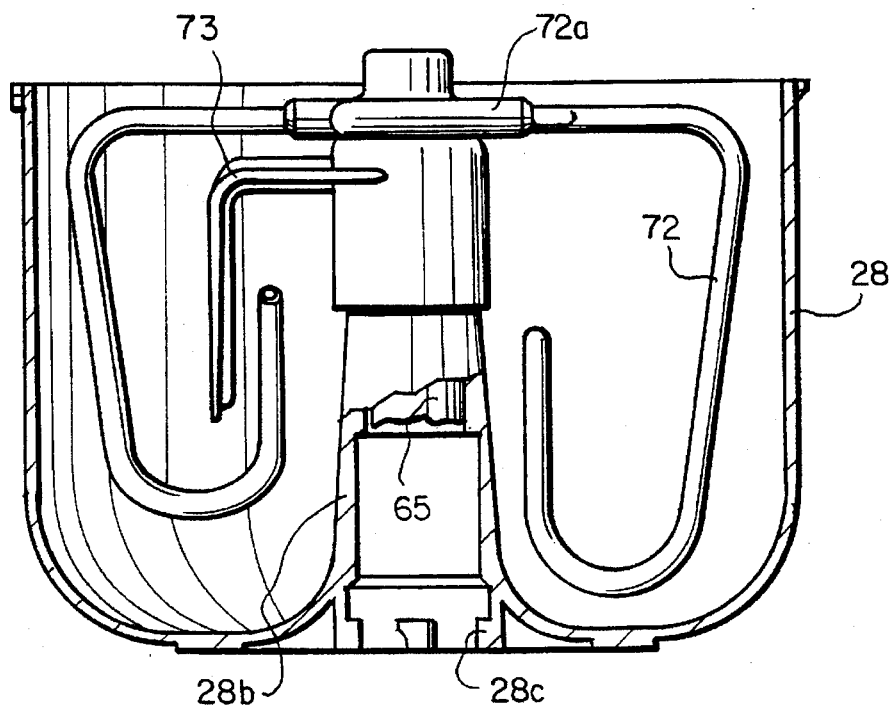

Base 22 has a molded compartment 22a having a lid 22b for a drive train, here shown as gearbox 62, FIGS. 3 and 5, for transmission of power to the mixing receptacle drive socket 64, as shown in FIG. 5. The lower output drive gear 66 on the lower end of the output armature shaft 32c of motor 32 is operatively engaged with gear train 68. Gear train 68 preferably achieves about a 160:1 gear reduction. It should be noted that gearbox 62 is an integral part of base 22 rather than a separate item merely mounted on base 22. Drive socket 64 in housing 63 mounted on lid 22b has vertically oriented splines 64a which operatively engage a correspondingly splined drive shaft 65 that extends through the central pillar 28b, FIG. 8, of mixing receptacle 28 and drives dough hooks 72. Housing 63 includes flanges 63a for receiving and locking mating tabs 28c, FIG. 8, thereunder to lock mixing receptacle 28 in place on the machine. Dough hooks 72 constitute only one type of mixing implement that can be provided. Another implement usually provided is made up of wire whisks (not shown).

Drive shaft 65 rotates dough hooks 72 in a counter-clockwise direction. Stator 73 remains in a fixed position, providing a stationary obstruction to the passage of the dough ball (not shown) on dough hooks 72. Dough hooks 72 extend radially from central hub 72a and angle forwardly relative to the direction of rotation, then angle downwardly and backwardly into the mixing receptacle, then angle upwardly and forwardly forming a final 180° bend. This configuration of the dough hooks pulls the dough ball downwardly into the mixing receptacle and, thus, not only helps prevent the lid from being pushed off but allows for maximum loading of dough into the receptacle.

Returning to the base 22, it is additionally provided with multiple air holes 74 and slots 76, FIG. 3, which allow entry of air to cool motor 32. Also mounted on the base is a circuit board 78 to which the various electronic components of the control circuit are mounted. An on/off switch 88 is secured to the base and electrically connected to the control circuit. The control circuit board is also electrically connected to a control panel and in the embodiment shown, circuit board 78 is connected to a control panel circuit board (not shown) by cable 80, FIG. 2. The control circuit includes an input means, such as the control panel 26, containing several push buttons which may conveniently take the form of membrane switches. For example, switch 90 may be a start switch, switch 92 a stop switch, switch 93 a switch to begin the automatic kneading feature of the machine, and switches 94 and 95 for other desired functions. Switches 96 and 97 may be used to increase or decrease, respectively, the speed setting of the machine, with the speed setting selected being displayed as a one digit number on display 98, and switches 99 and 100 may be used to increase or decrease, respectively, the time setting on the machine, the time set being displayed on display 101. The displays may be liquid crystal displays.

As previously mentioned, the invention may be provided with an automatic knead function which kneads bread or similar type dough to what has been determined as its ideal stage of gluten development and the stage at which the best bread or similar baked good will result. It has been determined that this ideal stage of development is at the end of the "development" stage of the dough just as the "let-down" stage begins. The dough gets harder and harder to knead through the "development" stage and gets easier to knead as it enters the "let-down" stage. Thus, for the automatic kneading function, the invention is provided with means for sensing the transition from increasing difficulty to knead to decreasing difficulty to knead. In the presently preferred embodiment, this is done by measuring the power fed to the motor to maintain kneading at a constant speed. The power needed to maintain a constant speed for kneading increases during the "development" stage, and decreases during the "let-down" stage. The transition from increasing power to decreasing power is detected and stops kneading at that time.

Figure 11:
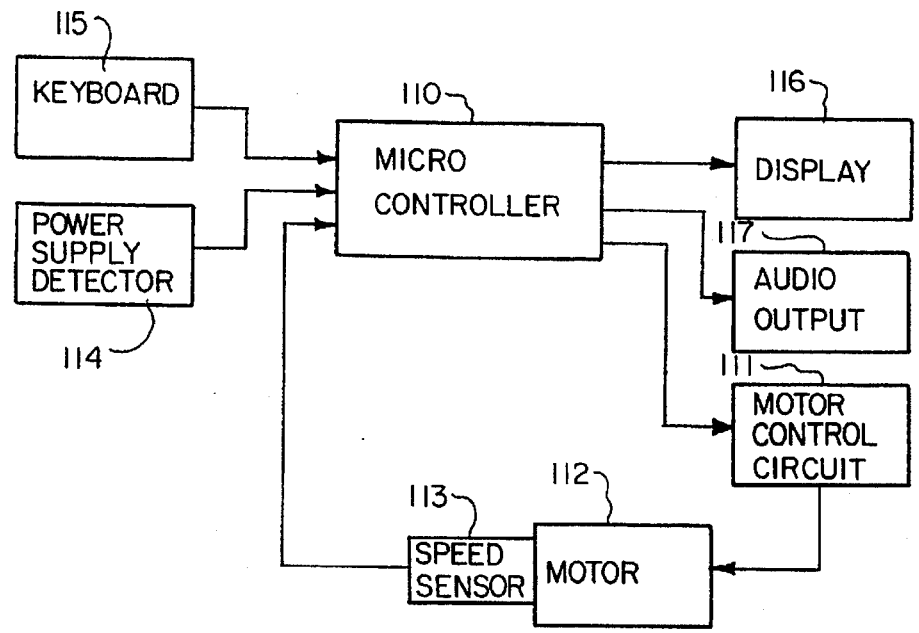

FIG. 11 is a block diagram of control circuitry usable with the invention. The control circuitry includes a microcontroller 110 which is programmed to control the operation of the invention. The microcontroller works through a motor control circuit 111 to control the speed of the motor 112. A speed sensor or tachometer 113 is coupled to the motor output shaft to measure the speed of the motor. The information as to motor speed sensed, usually a series of pulses, is sent to the microcontroller. Thus, the microcontroller drives the motor through motor control circuit 111. With an AC motor, the speed may be controlled by adjusting the phase angle of power supplied to the motor. The microcontroller will be programmed to control the phase angle by triggering the motor control circuitry at the desired time to provide power of desired phase angle to the motor. The microcontroller keeps track of the signals from the speed sensor to determine the speed of the motor and to adjust the phase angle to keep the speed constant. A power supply detector circuit 114 determines the crossover or zero crossing of the AC power and supplies a pulse to the microcontroller at each zero crossing, i.e., twice each cycle, so that the microcontroller can keep track of the phase angle of power being supplied to the motor. Since the load on the motor will vary at different points as the dough hooks 72 rotate in the mixing receptacle or bowl 28, the phase angle measurements are taken and averaged over a period of time so that an accurate trend of increasing or decreasing power is established. It has been found that averaging over 256 cycles gives an accurate indication of the power being supplied to the motor and allows the trend of increasing or decreasing power to be determined. Further, to increase the accuracy of the system, two consecutive averages of decreasing power are required to shut off the machine.

The circuitry includes a keyboard 115 to enable the user to enter instructions into the microcontroller, a display 116 to display information from the microcontroller, and, if desired, an audio output means 117 so the microcontroller can alert the user to certain conditions.

In operation of the invention, the user enters instructions to the microcontroller. For example, the user can enter a speed of operation using switches 96 and 97 until the desired speed setting is shown on display 98. The user can then enter the desired time for operation of the invention, such as 1 minute, by operating switches 99 and 100 until the desired time is shown on display 101. The user can then push the start switch 90 and the motor will operate at the set speed for the set time and then shut off. If it is desired to shut off the machine before the set time, stop switch 92 can be operated.

For automatic kneading, switch 93 is operated. The motor will be operated at a factory preset speed for an initial period of time generally sufficient to cover the "pick-up" and "clean-up" stages and will then start keeping track of the average power needed to operate the motor at the constant preset speed. The motor will continue operating until two consecutive periods of decreasing power requirement are detected. This indicates the dough is at its ideal stage and the motor shuts off. At this time the microcontroller can activate the audio output to alert the user that kneading is completed. The microprocessor can be programmed to shut off after a predetermined length of time, indicating that the ideal time must have been missed. It can also be programmed to measure power supplied to the motor over a preset period if time and compare such measurement to a preset value indicating overload of the motor and under such condition stop the motor until manually restarted, or stop the motor for a preset rest period, starting the motor again at the end of the rest period.

Figure 12:
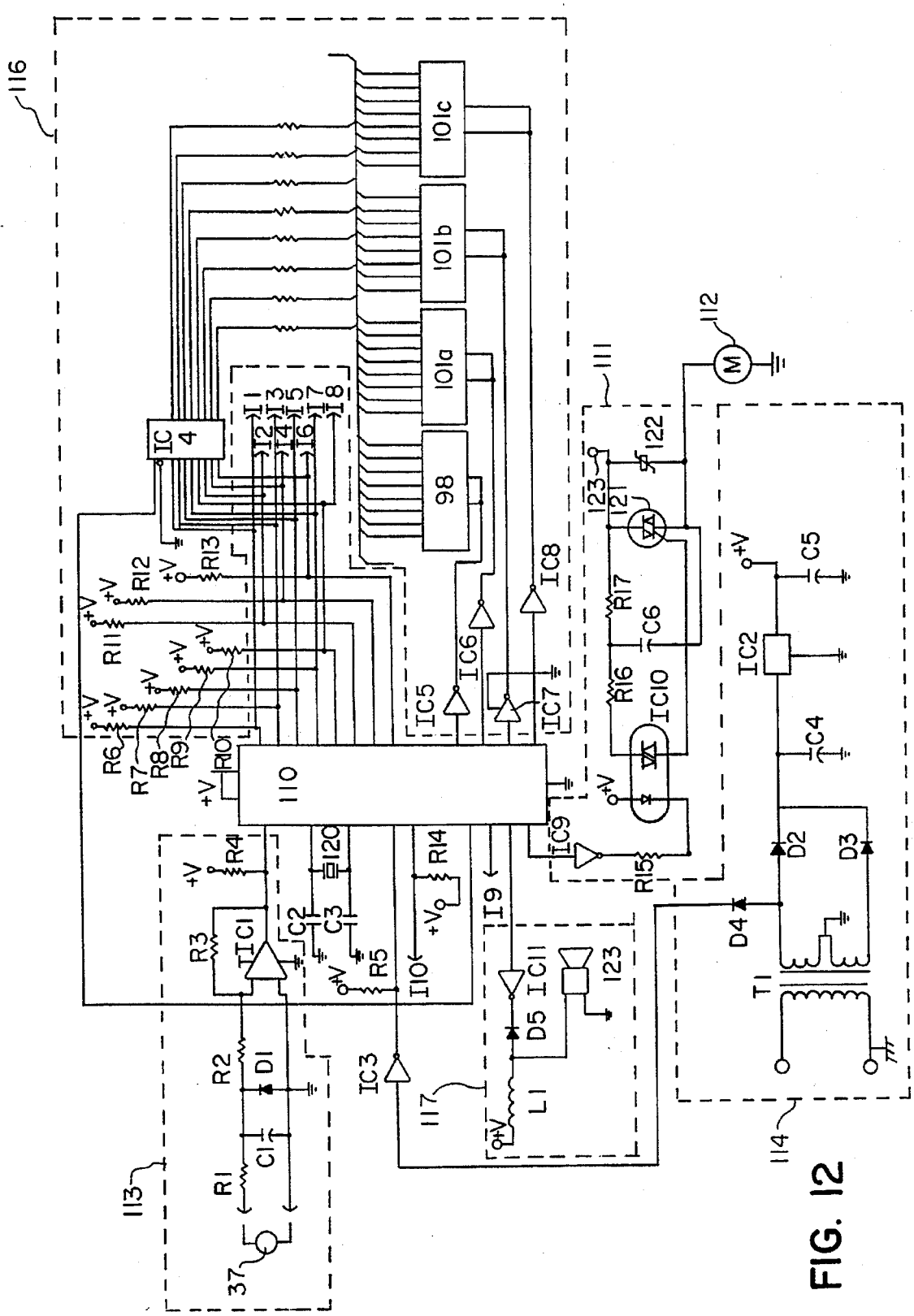

More detailed circuitry that can be used to implement the block diagram of FIG. 11 is shown in FIG. 12. The speed of the motor can be measured using magnetic pick up or speed sensing element 37 which produces a pulse each time a fan blade of fan 35 passes the sensing element 37. With a ten blade fan as shown, ten pulses will be produced for each revolution of the motor.

The pulses from speed sensing element 37 are connected to the input of comparator IC1 which, in conjunction with resistors R1, R2, R3, and R4, capacitor C1, and diode D1 provides a good 5 volt square wave output to microcontroller 110 corresponding to the input pulses from speed sensing element 37. Capacitors C2 and C3 and ceramic resonator 120 provide the oscillator for microcontroller 110. The microcontroller may be a Micro Chip 16C57, 8 bit, CMOS microcontroller.

Center tap transformer T1 along with diodes D2 and D3, capacitors C4 and C5, and voltage regulator IC2 provide a five volt regulated power supply for the components of the circuitry. The secondary voltage is applied through diode D4 to darlington combination IC3 which in conjunction with R5, produces a good pulse at each zero crossing of the AC voltage for input to microcontroller 110. This input allows microcontroller 110 to keep track of the AC zero crossings. Inputs I1–I9 are connected to the nine keyboard switches 90–97, 99 and 100, and, with resistors R6–R13, form inputs to the microcontroller from the keyboard. Inputs I1–I8 also operate as outputs to display segment driver IC4 which controls operation of the segments of displays 98 and 101. Display 101 is shown as having three digit displays 101a, 101b, and 101c. Input I10 with resistor R14 can be operated as a stop input. Microcontroller 110 also operates displays 98, 101a, 101b, and 101c through digit driver IC5–IC8.

The motor control output from microcontroller 110 is a pulse through IC9, resistor R15, and optoisolator IC10 which buffer and isolate the control pulses from the AC line. The output for IC10 triggers triac 121 to control power to motor 112. The time during each half cycle of AC power that triac 121 is triggered determines the phase angle of the power supplied to motor 112. Resistor R16 limits current through isolator IC10 while resistor R17, capacitor C6, and suppressor 122 provide filtering and protection for motor 112. The AC line power is connected at 123 and controlled by triac 121 to motor 112. Audio output is generated by microcontroller 110 through IC11, diode D5, choke coil L1, and piezoelectric sounder 123.

Details of programming microcontroller 110 will vary with the particular microcontroller used and the various features to be included in operation of the invention, but would be within the skill of one skilled in the art with the description of desired operation and circuitry given above.

Figure 10:
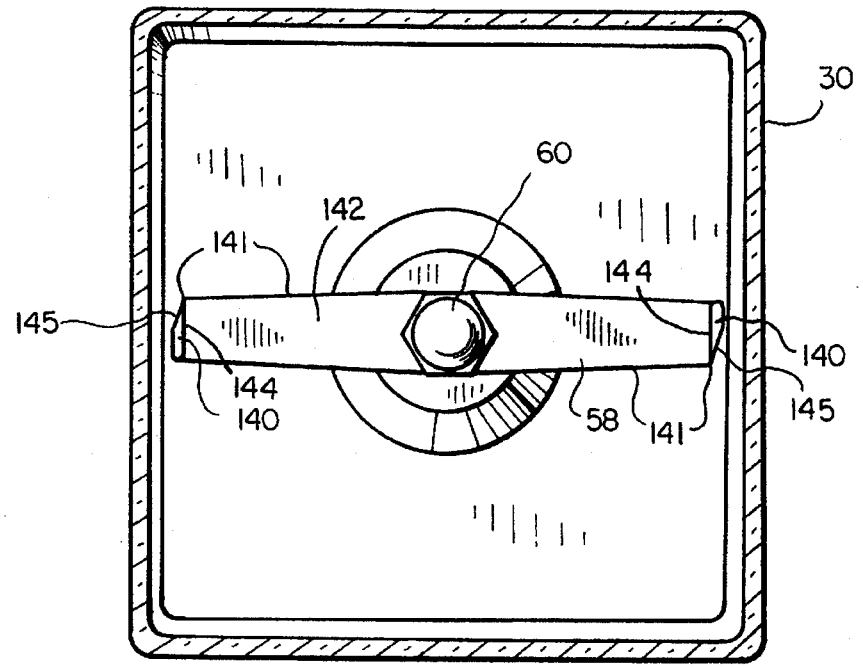

Another feature of the invention is the provision of a unique blender blade. The blade has upwardly extending end tips 140, FIGS. 6, 9, and 10, and a narrow leading edge 141. The blade end tips extend upwardly substantially parallel to the axis of rotation of the blade, and, for the particular embodiment shown, such blade end tips are substantially perpendicular to the blade adjacent its ends. The blade has a top surface 142 and downwardly and rearwardly sloping surfaces 143 extending from leading edge 141 to a position intermediate the lower surface of the blade. Thus, the blade is beveled downwardly and rearwardly from its top surface 142 to form leading edges 141. Each blade tip has an inward surface 144 generally facing toward the axis of rotation and an outwardly and rearwardly sloping surface 145 extending from tip leading edge 141 to a position intermediate the outer surface of the end tip. Thus, the blade end tip is beveled outwardly and rearwardly from its inward surface 144 to form end tip leading edges 141. The blender chamber around the blade is substantially square, rather than round as in conventional blenders and the blade is a single elongate blade. Mounted midway along its length for rotation in the blender chamber. As shown, the space between the blade end tips and the blender chamber walls is unobstructed. It is believed that the combination of the substantially square chamber and the single elongate blade of configuration shown combine to provide improved blending results.

Whereas this invention is here illustrated and described with reference to embodiments thereof presently contemplate as the best mode of carrying out such invention in actual practice, it is to be understood that various changes may be made in adapting the invention to different embodiments without departing from the broader inventive concepts disclosed herein and comprehended by the claims that follow.

I claim:

1. A blender appliance, comprising:
   a base;
   an electric motor mounted in the base;
   a receptacle having walls and mountable on the base;
   means for rotatably mounting a blade in the receptacle;
   a single, elongate blade having ends and a length and mounted midway along its length to the means for rotatably mounting a blade in the receptacle for rotation about an axis of rotation in a direction of rotation;
   blade tips extending upwardly from the ends of the blade and substantially perpendicularly to the blade adjacent its ends with unobstructed space between the blade tips and the receptacle walls, said blade tips each having an inward surface generally facing toward the axis of rotation of the blade, and being beveled outwardly and rearwardly from the inward surface to form a leading edge in the direction of rotation of the blade; and
   means for coupling the means for rotatably mounting a blade to the electric motor to cause rotation of the blade in the receptacle when the receptacle is mounted on the base.

2. A blender appliance according to claim 1, wherein the receptacle has a substantially square interior configuration around the blade.

3. A blender appliance according to claim 1, wherein the blade has an upper surface and is beveled downwardly and rearwardly from portions of the upper surface to form leading edges in the direction of rotation of the blade.

4. A blender appliance according to claim 1, wherein the receptacle is removably mounted on the base.

5. A blender appliance according to claim 4, wherein the receptacle has a bottom and wherein the means for coupling the means for rotatably mounting a blade in the receptacle to the electric motor includes a blade drive means at the bottom of the receptacle and a blade drive socket means in the base whereby the blade drive means is positioned in the blade drive socket means when the receptacle is mounted on the base.

6. A blender appliance according to claim 5, wherein the receptacle includes receiving feet at bottom corners thereof and the base includes mounting means extending therefrom to mate with and hold the receiving feet of the receptacle to position the receptacle on the base and position the blade drive means to mate with the blade drive socket means.

7. A blender appliance according to claim 4, wherein the base includes means for removably receiving the receptacle thereon.

8. A blender appliance according to claim 7, wherein the means for removably receiving the receptacle thereon positions the receptacle with respect to the base.

9. A blender appliance according to claim 8, wherein the means for removably receiving the receptacle includes at least one projection extending from the base to mate with the receptacle.

10. A blender appliance according to claim 1, wherein the blade has a length, and wherein the blade extends substantially perpendicularly to the axis of rotation throughout its length.

11. A blender appliance, comprising: a base;

an electric motor mounted in the base;

a receptacle having walls and mountable on the base;

means for rotatably mounting a blade in the receptacle;

a single, elongate blade having ends and a length and mounted midway along its length to the means for rotatably mounting a blade in the receptacle for rotation about an axis of rotation in a direction of rotation;

blade tips extending upwardly from the ends of the blade and substantially parallel to the axis of rotation with unobstructed space between the blade tips and the receptacle walls, said blade tips each having an inward surface generally facing toward the axis of rotation of the blade, and being beveled outwardly and rearwardly from the inward surface to form a leading edge in the direction of rotation of the blade; and means for coupling the means for rotatably mounting a blade to the electric motor to cause rotation of the blade in the receptacle when the receptacle is mounted on the base.

12. A blender appliance according to claim 11, wherein the receptacle has a substantially square interior configuration around the blade.

13. A blender appliance according to claim 11, wherein the blade has an upper surface and is beveled downwardly and rearwardly from portions of the upper surface to form leading edges in the direction of rotation of the blade.

14. A blender receptacle for use as part of a blender appliance, said blender appliance including a blender receptacle and a blender base, comprising:

a receptacle having walls and mountable on the base;

means for rotatably mounting a blade in the receptacle;

an elongate blade having ends and a length and mounted midway along its length to the means for rotatably mounting a blade in the receptacle for rotation about an axis of rotation in a direction of rotation;

blade tips extending upwardly from the ends of the blade and substantially parallel to the axis of rotation with unobstructed space between the blade tips and the receptacle walls, said blade tips each having an inward surface generally facing toward the axis of rotation of the blade, and being beveled outwardly and rearwardly from the inward surface to form a leading edge in the direction of rotation of the blade; and means for coupling the means for rotatably mounting a blade to a blender appliance base to cause rotation of the blade in the receptacle when the receptacle is mounted on a blender appliance base.

15. A blender receptacle according to claim 14, wherein the receptacle has a substantially square interior configuration around the blade.

16. A blender receptacle according to claim 14, wherein the blade has an upper surface and is beveled downwardly and rearwardly from portions of the upper surface to form leading edges in the direction of rotation of the blade.

17. A blender appliance, comprising a base;

an electric motor mounted in the base and oriented and attached perpendicularly to said base, said motor having a housing with a horizontally oriented platform member disposed above said motor, and an output motor armature shaft extending through said platform;

a plurality of post members extending in a direction parallel with the motor armature shaft from the platform member of the motor housing;

a blender drive socket on the end of the motor armature shaft above the platform member;

a base cover including post receiving extensions thereon for receiving the post members therein for securely positioning the base cover with respect to the motor;

a receptacle having feet to receive the post receiving extensions of the base cover;

means for rotatably mounting a blade in the receptacle;

an elongate blade mounted midway along its length to the means for rotatably mounting a blade for rotation in the receptacle; and means coupling the means for rotatably mounting a blade to the blender drive socket when the receptacle is positioned over the post receiving extensions.

* * * * *